United States Patent
Wu et al.

(10) Patent No.: US 6,319,886 B2
(45) Date of Patent: Nov. 20, 2001

(54) BLOWING AGENT BLENDS

(75) Inventors: Jinhuang Wu, King of Prussia; Douglas R. Dillon, Norristown, both of PA (US)

(73) Assignee: Atofina Chemicals, Inc., Phila, PA (US)

( * ) Notice: Subject to any disclaimer, the term of this patent is extended or adjusted under 35 U.S.C. 154(b) by 0 days.

(21) Appl. No.: 09/789,061

(22) Filed: Feb. 16, 2001

Related U.S. Application Data

(62) Division of application No. 09/525,843, filed on Mar. 15, 2000.

(51) Int. Cl.[7] .............................. C08G 18/06; C11D 17/08
(52) U.S. Cl. ................... 510/412; 510/415; 252/182.24; 521/131; 521/155
(58) Field of Search ..................................... 521/131, 155; 252/182.24; 510/412, 415

(56) References Cited

U.S. PATENT DOCUMENTS

| | | | |
|---|---|---|---|
| 4,636,529 | 1/1987 | Crooker | 521/131 |
| 5,444,101 | * 8/1995 | De Vos et al. | 521/155 |

OTHER PUBLICATIONS

"Hydrocarbon Blown Rigid Polyurethane Foam For the Boardstock Industry—A Novel Approach" by R. Berrier et al, 9/98.

* cited by examiner

*Primary Examiner*—John M. Cooney, Jr.
(74) *Attorney, Agent, or Firm*—William D. Mitchell; Stanley A. Marcus

(57) ABSTRACT

Foam blowing agents blends of 5–50 mole % HCFC-22 and 95–50 mole % of n-pentane, i-pentane and/or cyclopentane are provided, as are polyol premixes and polyurethane foam compositions containing such blends.

3 Claims, No Drawings

BLOWING AGENT BLENDS

This Application is a Divisional Application of U.S. Ser. No. 09/525,843, filed Mar. 15, 2000.

BACKGROUND OF THE INVENTION

This invention relates to foam blowing agent blends of (a) chlorodifluoromethane ("HCFC-22" or "22") with (b) n-pentane (n-C5), i-pentane (i-C5) and/or cyclopentane (c-C5) and to polyol premixes and polyurethane foam compositions containing such blends.

Until now, the leading polyurethane foam blowing agent has been 1,1-dichloro-1-fluoroethane ("141b"), in order to meet the market place requirements for energy, fire performance and cost. At the same time, however, 141b has a high ozone depletion potential ("ODP") of about 0.1. Thus, many foam manufacturers are now investigating the lower ODP pentanes as candidates to replace 141b, as noted for example in an article on "Hydrocarbon Blown Rigid Polyurethane Foam for the Boardstock Industry—A novel Approach" by R. E. Berrier et al which appeared in Polyurethanes Expo '98, Sep. 17–20, 1998. They too, however, have property shortcomings for use in foam, such as high cost and high k-factor performance in foam (thus giving foams with poor thermal insulating properties).

HCFC-22 has also been disclosed, as in U.S. Pat. No. 4,636,529) for use as a foam blowing agent agent. When used alone, it has certain disadvantages such as a high global warming potential ("GWP") of about 1700 and an ODP of about 0.055.

It would therefore be useful to provide the industry with an alternative foam blowing agent which overcomes the deficiencies of 22 or the pentanes alone in terms of properties such as ODP, GWP, cost, and k-factor performance.

BRIEF SUMMARY OF THE INVENTION

Foam blowing agent compositions are provided, which compositions comprise (a) about 5 to 50 mole % of chlorodifluoromethane and (b) about 95 to 50 mole % of a pentane selected from the group consisting of one or more of n-pentane, i-pentane and cyclopentane, as well as foam premix compositions, which premix compositions comprise a polyol and the foregoing blowing agent blend, and polyurethane foam compositions, which foam compositions comprise an A-side containing an isocyanate and a B-side containing a polyol and all or a portion of the foregoing blowing agent blend.

DETAILED DESCRIPTION

It has now been found that the foregoing blends of pentanes with HCFC-22 overcomes deficiencies associated with the use of either alone. Most important, as shown below, the addition of relatively small amounts of 22 has been found to lower the k-factor (and thus enhance the thermal insulating properties) of foams made with such blends relative to the use of the pentanes alone, while still taking advantage of the low ODP (zero) and GWP properties of the pentanes (for example, cyclopentane has a GWP of 11 versus a GWP of 1700 for 22 alone). Other advantages include lowering of the cost of use of pentanes alone (especially cyclopentane), improved solubility in raw materials such as polyester polyols (especially for n-pentane and i-pentane) and less volatile organic compound ("VOC") content than pure hydrocarbon since HCFC-22 is not a VOC.

The unexpected improvement shown in the following examples in low temperature (0° C.) k-factor performance is particularly significant for many foam applications such as for refrigerators, freezers and cold storage facilities.

The preferred amount of 22 in the blends varies with the particular pentane or pentane mixture, as shown by the examples below, but is generally in the 10–35 mole % range.

In the premix compositions, the blowing agent blend is typically present in a concentration range of about 2–60 weight % (preferably 5–40 weight %), based on the weight of the polyol.

In the polyurethane foam compositions, the effective concentrations of the blends are typically about 0.1–25 weight % (preferably 0.5–15%) based on the weight of the total polyurethane foam formulation.

The pentane component and/or the 22 component of the blend can be added to the A-side or the B-side or a portion thereof distributed in each side. It is also possible to add the blowing agent composition as a third stream to the foam machine, wholly apart from the A- or B-side.

The other components of the premix and foam formulations may be those which are conventionally used, which components and their proportions are well known to those skilled in the art. For example, catalysts, fire retardants and surfactants are typical components of the B-side.

The practice of the invention is illustrated in more detail in the following non-limiting examples. The formulations used (all having an Iso Index of 300) each contained 170.51 parts M-489, a polymeric methane diphenyl diisocyanate available from Bayer Corporation; 100 parts T-2541, a polyester polyol having a hydroxyl number of 240 available from Kosa; 0.19 part PC-5 and 0.33 part PC-46, which are, respectively, pentamethyldiethylenetriamine and potassium acetate in ethylene glycol, catalysts available from Air Products; 2.98 parts K-15, potassium octoate in dipropylene glycol, a catalyst available from Air Products; 2 parts B-8462, a polysiloxane-polyether copolymer surfactant available from Goldschmidt Chemical Corporation; 10 parts AB-80, a tris(1-chloro-2-propyl)phosphate fire retardant available from Albright & Wilson Americas, Inc; and about 24–25 parts blowing agents, the exact amounts of which are more particularly set forth below; all parts are by weight.

A-side premix components, containing isocyanate and 75% of the blowing agent, were mixed and cooled to 10° C. B-side premix components, containing polyol, surfactant, fire retardant, and 25% of the blowing agent, were also mixed and cooled to 10° C.

TABLE I

Parts of Blowing Agent in Comparative
Examples with only Pentane Blowing Agent

| i-C5: | 24.91 | 9.96 | — | — |
| c-C5: | — | 14.53 | 24.23 | — |
| n-C5: | — | — | — | 24.91 |

TABLE II

Parts of Blowing Agent in Invention
Examples with 10 Mole %* 22 in Blowing Agent Blend

| i-C5: | 22.43 | 8.97 | — | — |
| c-C5: | — | 13.08 | 21.80 | — |
| n-C5: | — | — | — | 22.43 |
| HCFC-22: | 2.99 | 2.99 | 2.99 | 2.99 |

TABLE II-continued

Parts of Blowing Agent in Invention
Examples with 10 Mole %* 22 in Blowing Agent Blend

*For examples with 5, 15 and 20 mole % of HCFC-22, the proportional amount of 22 relative to the pentane content was varied In making the foam, the A and B side premixes were mixed for 20 seconds, followed by injection of the catalyst mixture. Mixing was continued for 15 seconds (except for the i-CS/22 blend, for which the mixing continued for only 10 seconds in order to reduce frothing), after which the mixture was poured into a box.

ASTM procedures were then followed to measure (initial) k-factors (ASTM C518) of the resultant foams at ambient temperature (24° C.) and at 0° C. The results are shown in Tables III and IV:

TABLE III

K-factors (in BTU.in/ft$^2$.hr.° F.) at 24° C.
(%s in blends are in mole %)

| | |
|---|---|
| For 100% n-C5: | 0.173 |
| For 5%/95% blend of 22/n-C5: | 0.171 |
| For 10%/90% blend of 22/n-C5: | 0.167 |
| For 100% i-C5: | 0.167 |
| For 5%/95% blend of 22/i-C5: | 0.164 |
| For 10%/90% blend of 22/i-C5: | 0.164 |
| For 15%/85% blend of 22/i-C5: | 0.163 |
| For 100% c-C5: | 0.161 |
| For 10%/90% blend of 22/c-C5: | 0.161 |
| For 20%/80% blend of 22/c-C5: | 0.154 |
| For 100% of a 60/40 c-C5/i-C5 blend: | 0.160 |
| For 5%/95% blend of 22 with the 60/40 c-C5/i-C5 blend: | 0.160 |
| For 10%/90% blend of 22 with the 60/40 c-C5/i-C5 blend: | 0.156 |
| For 20%/80% blend of 22 with the 60/40 c-C5/i-C5 blend: | 0.151 |

TABLE IV

K-factors (in BTU.in/ft$^2$.hr.° F.) at 0° C.
(%s in blends are in mole %)

| | |
|---|---|
| For 100% n-C5: | 0.192 |
| For 5%/95% blend of 22/n-C5: | 0.183 |
| For 10%/90% blend of 22/n-C5: | 0.176 |
| For 100% i-C5: | 0.177 |
| For 5%/95% blend of 22/i-C5: | 0.165 |
| For 10%/90% blend of 22/i-C5: | 0.160 |
| For 15%/85% blend of 22/i-C5: | 0.157 |
| For 100% c-C5: | 0.159 |
| For 10%/90% blend of 22/c-C5: | 0.156 |
| For 20%/80% blend of 22/c-C5: | 0.147 |
| For 100% of a 60/40 c-C5/i-C5 blend: | 0.167 |
| For 5%/95% blend of 22 with the 60/40 c-C5/i-C5 blend: | 0.166 |
| For 10%/90% blend of 22 with the 60/40 c-C5/i-C5 blend: | 0.157 |
| For 20%/80% blend of 22 with the 60/40 c-C5/i-C5 blend: | 0.148 |

What is claimed is:

1. A foam blowing agent composition comprising (a) about 5 to 50 mole % of chlorodifluoromethane and (b) about 95 to 50 mole % of a pentane selected from the group consisting of one or more of n-pentane, i-pentane and a mixture of i-pentane and cyclopentane.

2. The composition of claim 1 wherein the pentane is a mixture of i-pentane and cyclopentane.

3. A foam blowing agent composition comprising (a) about 5 to 50 mole % of chlorodifluoromethane and (b) about 95 to 50 mole % of a pentane selected from the group consisting of one or more of n-pentane and i-pentane.

\* \* \* \* \*